United States Patent Office 3,255,852
Patented June 14, 1966

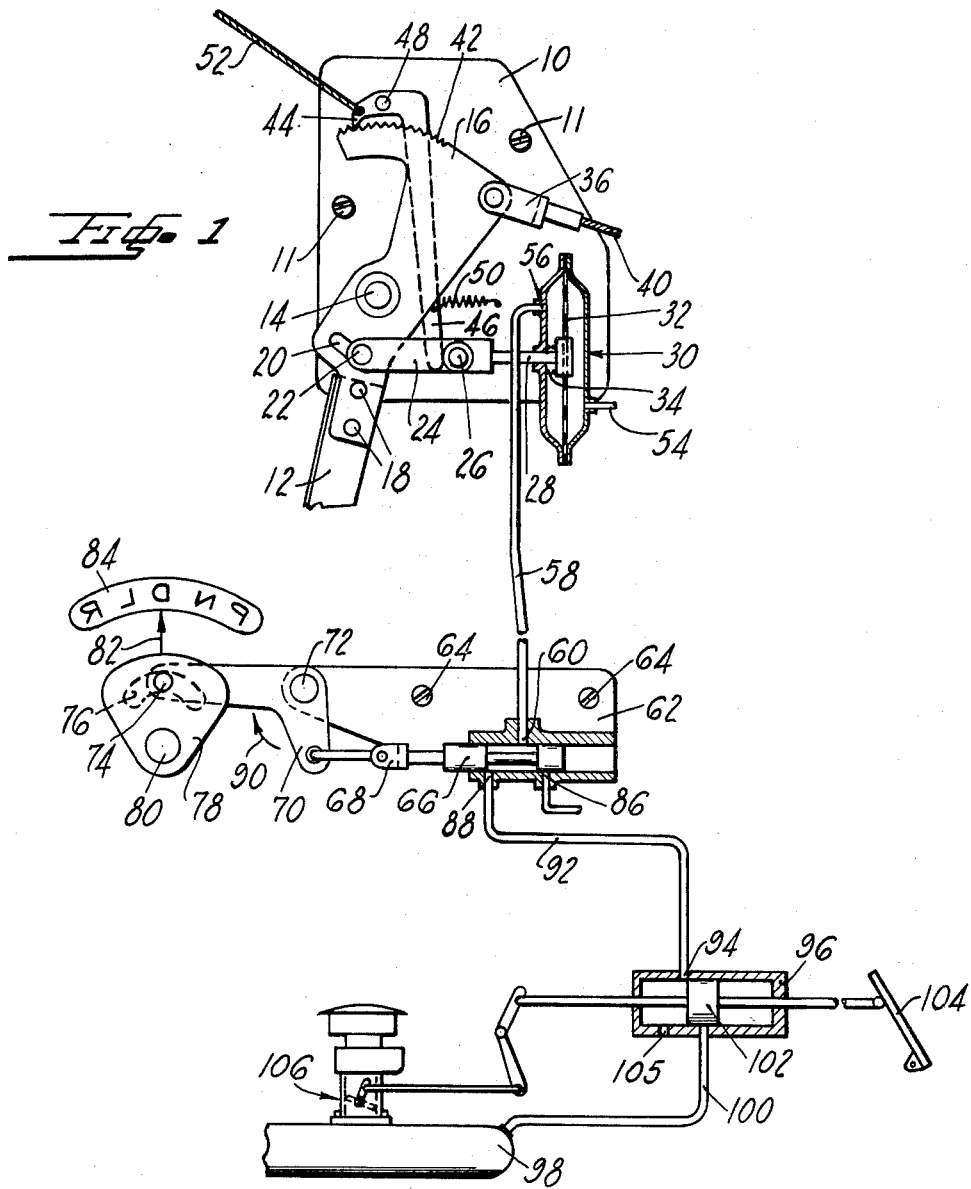

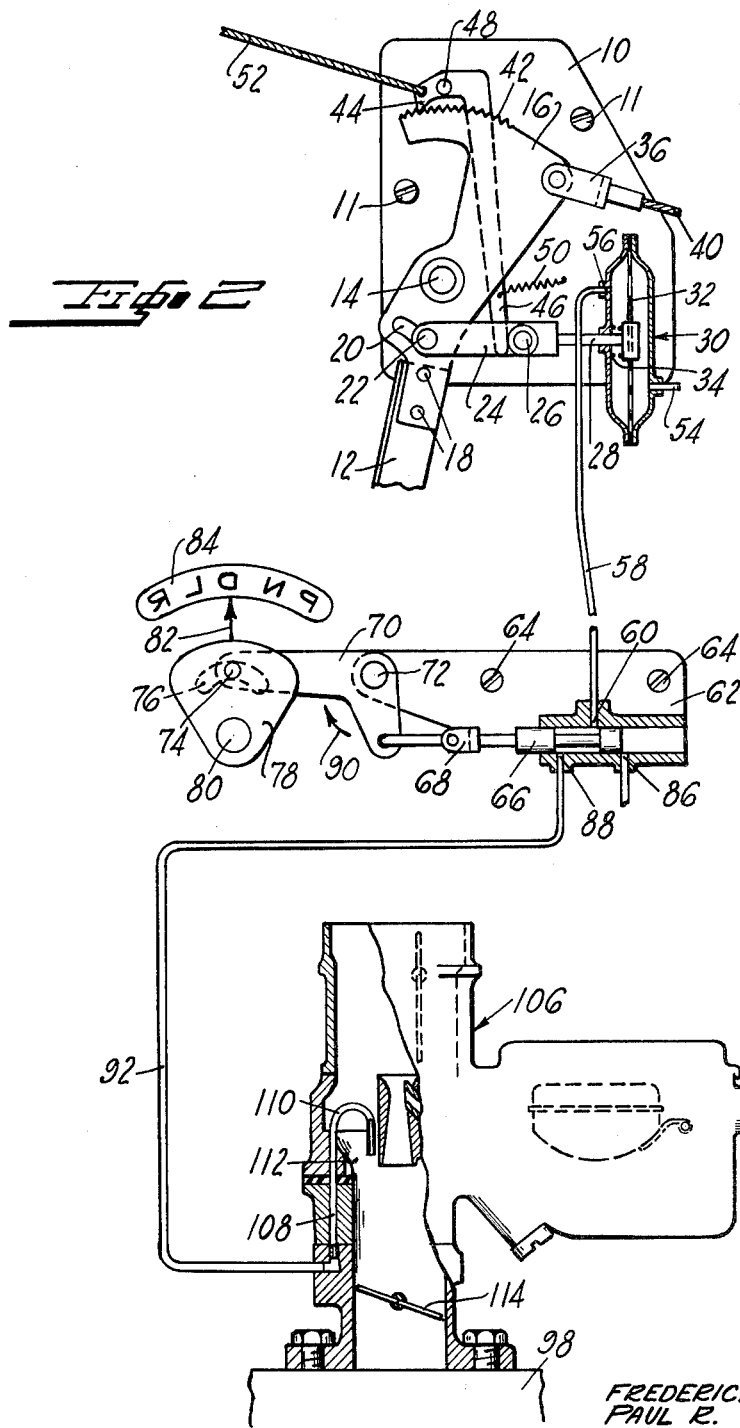

3,255,852
POWER OPERATED EMERGENCY BRAKE RESPONSIVE TO MOTOR CONTROL
Frederick W. Martin, South Bend, Ind., and Paul R. Wiley, Indian River City, Fla., assignors to The Bendix Corporation, South Bend, Ind., a corporation of Delaware
Filed July 22, 1964, Ser. No. 384,408
1 Claim. (Cl. 192—4)

This invention relates to a power parking brake release having means to interrupt a power supply until at least two conditions are met to provide fail-safe features not heretofore suggested.

It is usually the practice in vehicle brake systems to provide both service and auxiliary brake applying systems, the latter being used for parking and also in the event of failure of the service brake applying system. The auxiliary brake applying system may be associated with the brake which is separate from the service brakes, or it may be associated with the service brakes. The present invention is adapted for both arrangements.

With some of the fluid actuated parking brake systems, there is required a releasing effort which is proportional to the applying effort. While it is desirable that parking brake systems have an operating mechanism by which it is easy to develop a maximum amount of applying effort, it is obvious that this input of effort should not necessitate releasing forces which are impracticably high.

With these requirements in mind, it is a principal object of this invention to provide an automatic, power operated emergency brake release, with means for manual control, in the event of a power failure.

It is another object of this invention to provide a power operated emergency brake release having an automatic, power means for disengaging a holding mechanism for an emergency brake actuator, which means may readily be installed on old or new motor vehicles equipped with conventional brake mechanisms and transmissions.

It is a further object of this invention to provide means for automatically disengaging the emergency brake, simultaneously with the changing of the position of the transmission gear selector mechanism.

A still further object of this invention is to provide means for automatically disengaging the emergency brake, simultaneously with the changing of the position of the transmission gear selector mechanism and the depression of the accelerator for the vehicle.

Yet still another object of this invention is to provide means for automatically disengaging the emergency brake, simultaneously with the changing of the position of the transmission gear selector mechanism and the scheduling of fuel for the engine of the vehicle in excess of that required to idle the engine.

Other objects and features of the invention will become apparent from a consideration of the following description, which proceeds with reference to the accompanying drawings, wherein:

FIGURE 1 is a schematic view of the foot lever type of emergency brake control having a power release motor controlled by valving that includes means responsive to transmission selector control as well as means responsive to accelerator pedal control; and FIGURE 2 is a schematic view similar to FIGURE 1 showing a modification whereby the power fluid source is communicated with a carburetor venturi passage for an engine of the associated vehicle.

With specific reference to FIGURE 1, we have shown a mounting plate 10 secured by means of screws 11 to the body of a motor vehicle (not shown) quipped with a foot lever operated emergency brake, and an automatic transmission, and provided with a gear mechanism.

As may be expected by those skilled in the art to which our invention relates, the mounting plate is positioned in a conventional manner on the driver's side of the vehicle for convenient manipulation by the driver, of a foot lever 12 pivoted, as at 14, to the mounting plate 10. The foot lever 12 terminates in a pedal type foot piece (not shown) at one end and is provided with a bearing plate 16 at the opposite end secured thereto as by rivets 18. The bearing plate 16 has a slot 20 formed therein that is adapted to cooperate with a pin 22 to provide a lost motion connection between a link 24 and the bearing plate 16.

As seen in FIGURE 1, the link 24 is connected by means of a pin 26 to a piston rod 28 for a pneumatic motor 30 having a diaphragm 32 therein that is biased by a spring 34 to the neutral shown whenever the pressure on either side of the diaphragm within the motor 30 is substantially equal.

A clevis 38 is pivoted, as at 36, to plate 16, which clevis is in turn connected to a cable 40 that is operatively connected to an emergency brake applying lever (not shown) for at least two of the vehicle's wheel brakes. Such connection of the emergency brake applying lever with the cable 40 being considered within the foreseeability of those familiar with the art to which our invention relates, and, therefore, not needing further explanation herein. It should be understood that such a system as ours is equally applicable to prop shaft emergency brakes.

The bearing plate 16 is provided with a series of ratchet teeth along its uper edge, as at 42, which teeth are adapted to be engaged by a locking pawl 44 formed on one end of a locking arm 46, which is pivoted, as at 48, to the mounting plate 10. The lower end of the arm 46 is spring loaded, as by spring 50, so that the arm 46 is normally urged into locking position. The arm 46 is moved out of locking position by means of the pivot pin 26 whose movement is controlled by the servomotor 30. The arm 46 may also be moved out of locking position by means of a hand pull 52, in the event manual release is desired.

As seen, the servomotor 30 is of atmospheric suspended type, having an inlet 54 for one side of the motor 30 that is open to atmosphere with another inlet 56 on the other side of the motor 30 connected to a conduit 58 that is communicated to a discharge port 60 of a valve means. The diaphragm 32 divides the motor 30 into two variable volume chambers open, respectively, to inlets 54 and 56 but not to each other.

The valve means is mounted on a bracket 62 secured by screws 64, or other suitable means, to a permanent part of the motor vehicle. The valve is provided with a spool 66 which is connected by linkage 68 to a bellcrank 70 pivoted, as at 72, to the bracket 62. The bellcrank 70 terminates in a cam follower 74 that engages a cam 76 in a cam plate 78 affixed to a shift rod 80 for the motor vehicle. The cam plate 78 is provided with a pointer 82 that cooperates with a visual indicator 84 to provide an operator of the vehicle with an indication of the transmission upon his movement of the shift control 80. It should be realized that the gear selector sequence shown is but one of the many available on today's automobiles for which the cam 76 can be designed.

In addition, the valve is provided with an atmospheric pressure inlet 86 and a control pressure inlet 88 that according to the position of the bellcrank 70 is in communication with the discharge 60 independently of each other. In other words, the bellcrank 70 rotates in the direction of an arrow 90, the valve spool 66 will terminate the communication of inlet 86 with discharge 60 and open communication of inlet 88 with discharge 60. This will be explained in greater detail hereinafter.

We have provided a conduit 92 that is in communication with the control inlet 88 and with a discharge opening 94 in a valve body 96 interposed between a fluid pressure source such as an engine intake manifold 98 and the valve means aforementioned. The intake manifold 98 is communicated by means of conduit 100 to the valve body 96, and a valve spool 102 within the valve body is arranged such that upon the pressing of an accelerator pedal 104, conduits 92 and 100 are in fluid flow communication. However, in the rest position shown the conduit 92 is open to atmosphere by way of port 105 in housing 96. As shown, the depression of the accelerator pedal 104 will move appropriate linkage to schedule fuel flow in a carburetor 106 for the motor vehicle.

As for the modification shown by FIGURE 2, we have eliminated the need for the valve body 96 as shown in FIGURE 1 by attaching the conduit 92 to the carburetor 106 such that it is in communication with an internal passage 108 within the carburetor leading to a tubular pressure take-off 110 opening into the throat of a venturi passage 112 within the carburetor.

In either case, the depressing of the accelerator 104 to schedule increased fuel supply within the carburetor 106 or the opening of the throttle butterfly 114 as seen in FIGURE 2 to increase the fluid flow through the carburetor to create a vacuum adjacent the pressure take-off 110 before a control fluid can be supplied to conduit 92.

As seen in FIGURE 2, the throttle butterfly 114 has been moved from its idle position shown by the phantom lines to schedule an increased fluid flow to the intake manifold 98 which will draw a vacuum in the line 92. As the gearshift rod 80 has positioned the cam plate 78 in the drive position, the bellcrank 70 has moved the spool 66 to a position allowing communication of inlet 88 with the discharge 60 of the valve means so that the vacuum in line 92 is also prevalent in line 58 to create a pressure differential flow across the diaphragm 32 to release the locking pawl 44.

This would be similarly true in FIGURE 1 if the accelerator pedal 104 were depressed to allow communication between conduits 100 and 92, as may be expected upon accelerating a vehicle from a standstill.

It will thus be apparent that the present invention improves upon the prior art by eliminating the defect therein that the emergency brake may be inadvertently released by merely moving a transmission drive selector, as by a child who has been left in a vehicle while the engine is still running.

More particularly, the prior art devices heretofore suggested do not have means of holding a vehicle with a locked parking brake while the transmission selector is in a drive range and with the engine running in order to adjust a carburetor idle position, check an automatic transmission fluid level and perform other service functions. Furthermore, the prior art, as we understand it, has a defect in that one cannot apply an emergency brake when the transmission selector is in the drive range without it subsequently releasing. It is believed that we have described an invention which can be constructed to accomplish all the objects set out. However, it is to be remembered that the embodiments suggested herein are purely illustrative, and that the scope of our invention is set forth by the appended claim only.

We claim:

An emergency brake holding and release mechanism comprising:
- a brake actuating member;
- a releasable locking means operably connected to said member, which locking means automatically holds said member in any position to which it is moved;
- a vacuum operated servomotor operatively connected to said locking means, said servomotor having an inlet port and an atmospheric port;
- a valve means operatively connected to a vehicle gear selector means, said valve means having a vacuum inlet port and an atmospheric inlet port separated by a spool with an intermediate discharge port that is operatively connected to said servomotor vacuum port, said spool being arranged to communicate either said vacuum inlet port or said atmospheric inlet port to said discharge port in accordance with the position of the gear selector means; and
- a conduit means for communicating a vacuum source including a vehicle carburetor having a venturi passage controlled by a butterfly valve with a vacuum pressure take off into said passage adjacent a throat for the venturi above said butterfly valve so that when said butterfly valve is in the idle position for said carburetor the conduit means is exposed to atmospheric pressure and adequate vacuum to operate said servomotor cannot be obtained until the butterfly valve is operated to open the venturi passage beyond the idle position.

References Cited by the Examiner
UNITED STATES PATENTS

| | | | |
|---|---|---|---|
| 2,478,884 | 8/1949 | Wiseley | 192—4 |
| 2,867,310 | 1/1959 | Martin | 192—4 |
| 2,945,571 | 7/1960 | Yanda | 192—4 |
| 3,119,477 | 1/1964 | Ryder | 192—3 |

DAVID J. WILLIAMOWSKY, *Primary Examiner.*